No. 755,333. PATENTED MAR. 22, 1904.
J. H. TORNEY.
FOLDABLE CONVEYER.
APPLICATION FILED MAR. 10, 1903.
NO MODEL. 5 SHEETS—SHEET 1.
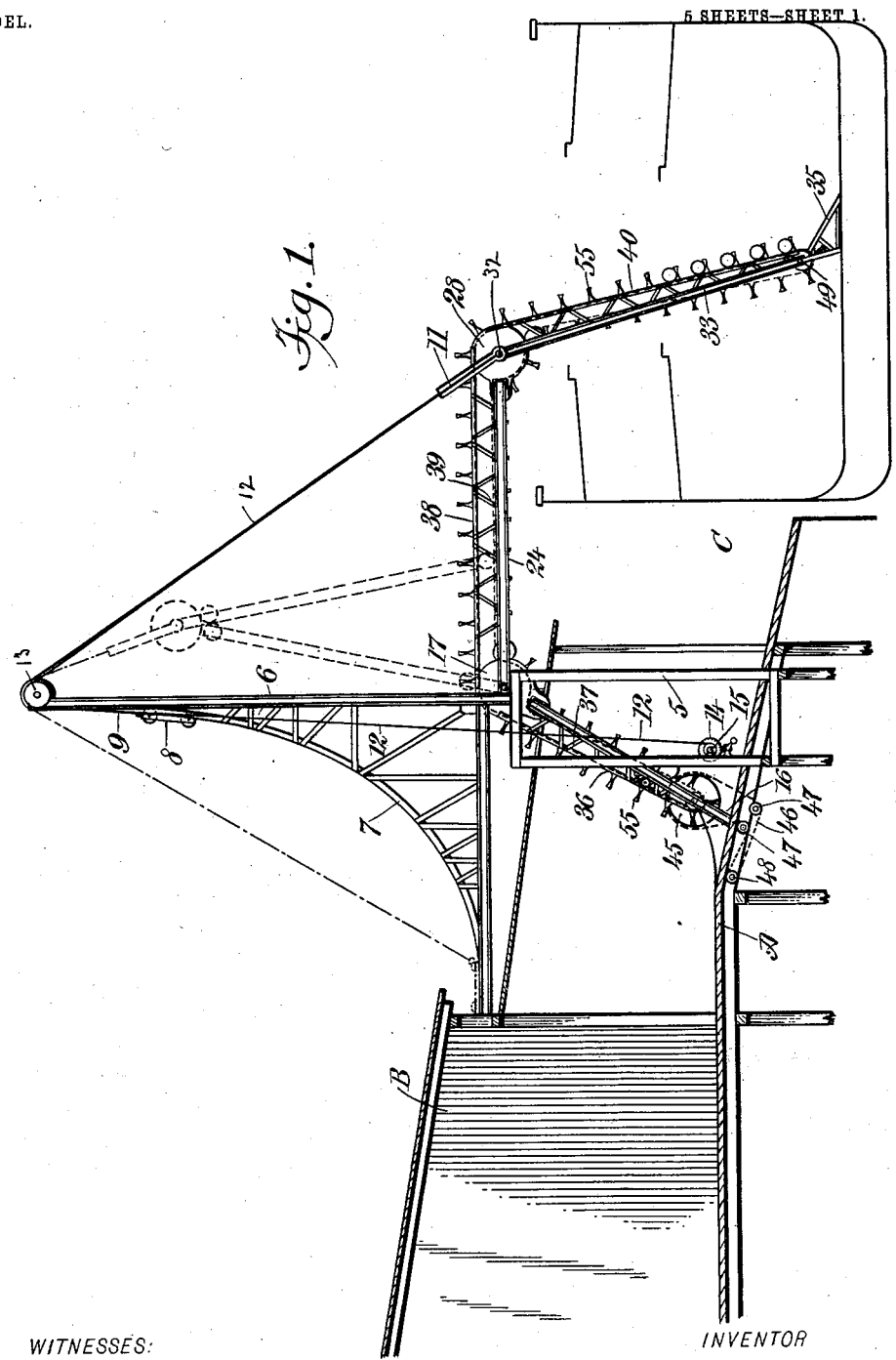
WITNESSES:
INVENTOR
James H. Torney
BY Munn
ATTORNEYS.

No. 755,333. PATENTED MAR. 22, 1904.
J. H. TORNEY.
FOLDABLE CONVEYER.
APPLICATION FILED MAR. 10, 1903.
NO MODEL. 5 SHEETS—SHEET 2.
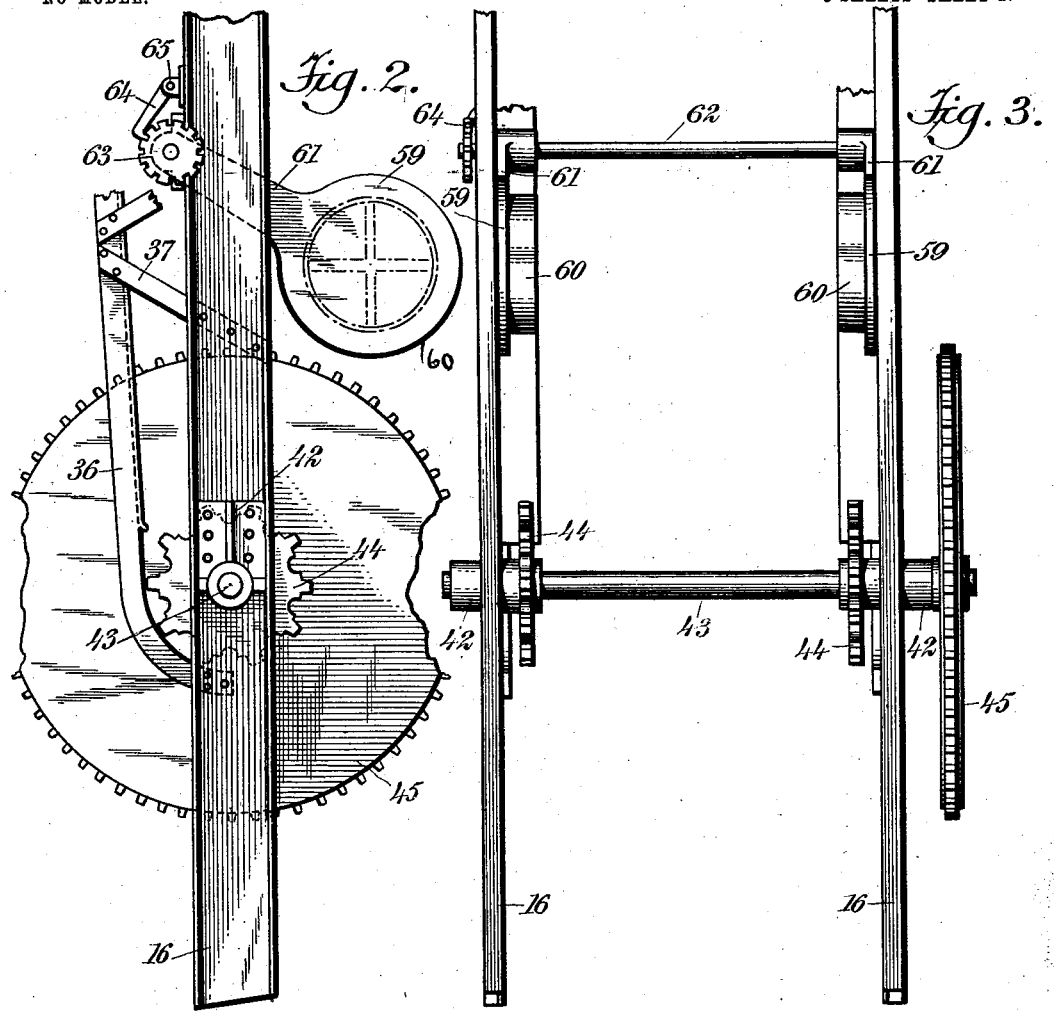
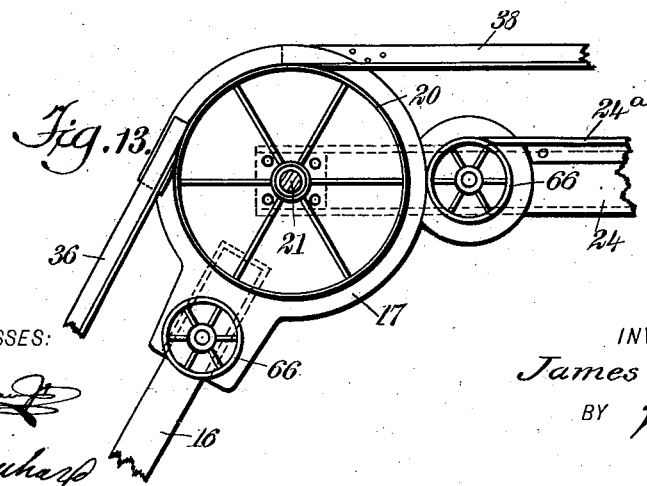
WITNESSES:
INVENTOR
James H. Torney
BY
ATTORNEYS.

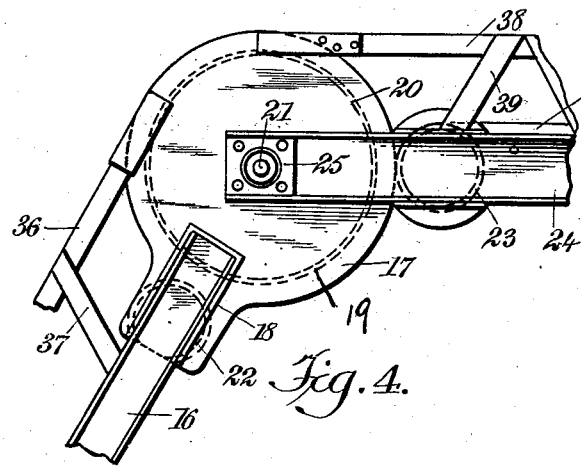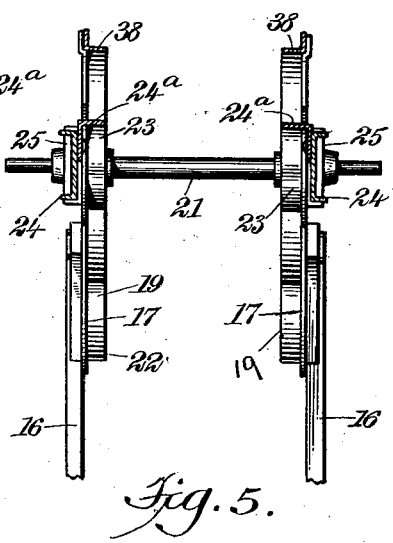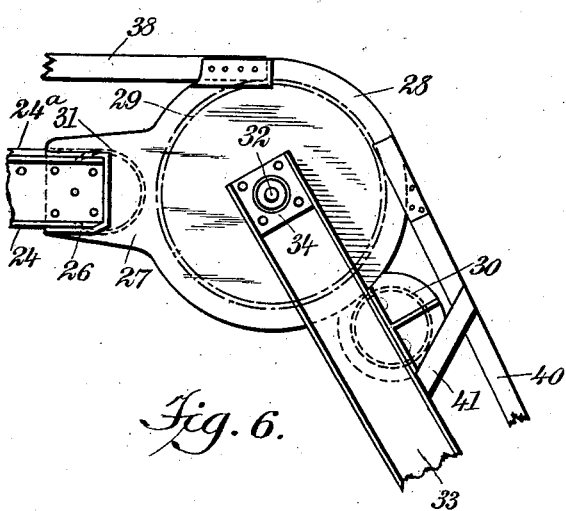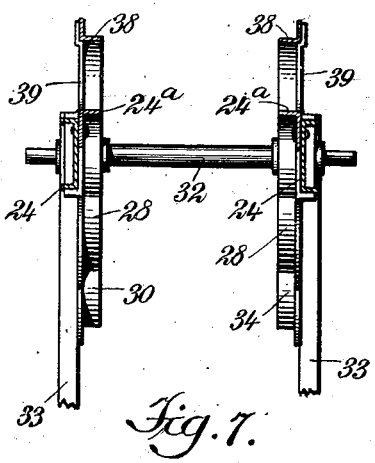

No. 755,333. PATENTED MAR. 22, 1904.
J. H. TORNEY.
FOLDABLE CONVEYER.
APPLICATION FILED MAR. 10, 1903.
NO MODEL. 5 SHEETS—SHEET 4.
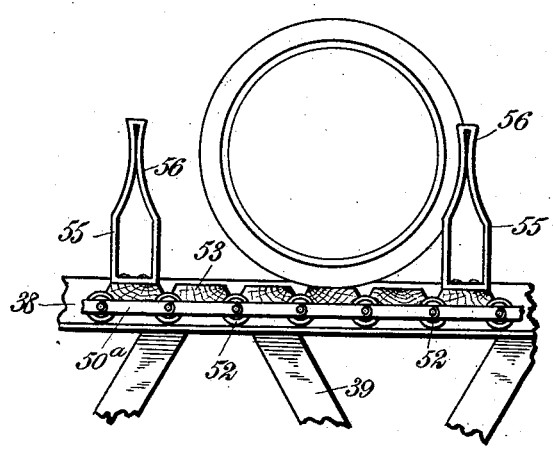
Fig. 8.
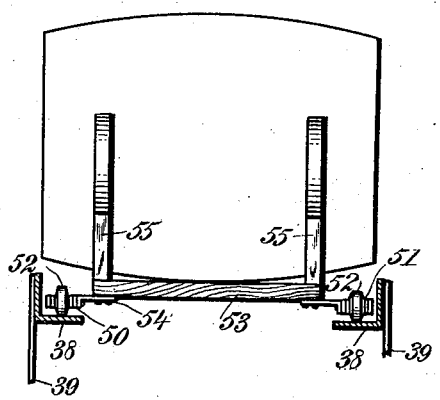
Fig. 9.
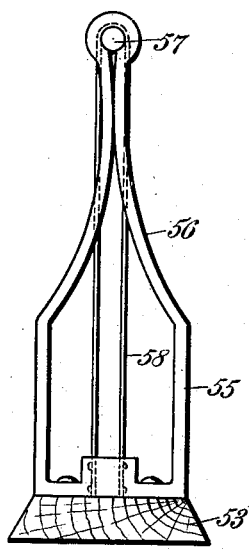
Fig. 10.
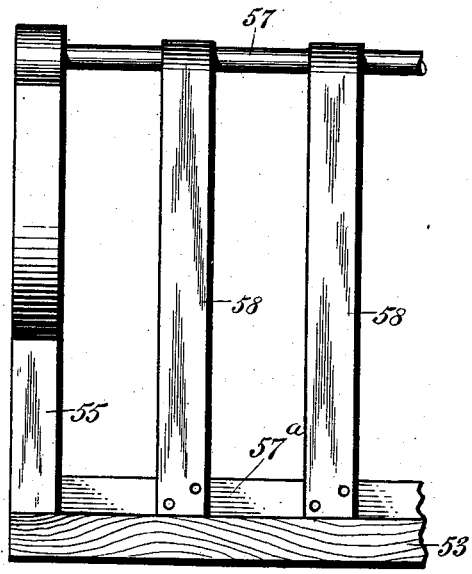
Fig. 11.
Fig. 12.
WITNESSES:
INVENTOR
James H. Torney
BY
ATTORNEYS.
THE NORRIS PETERS CO., PHOTO-LITHO., WASHINGTON, D. C.

No. 755,333. PATENTED MAR. 22, 1904.
J. H. TORNEY.
FOLDABLE CONVEYER.
APPLICATION FILED MAR. 10, 1903.
NO MODEL. 5 SHEETS—SHEET 5.
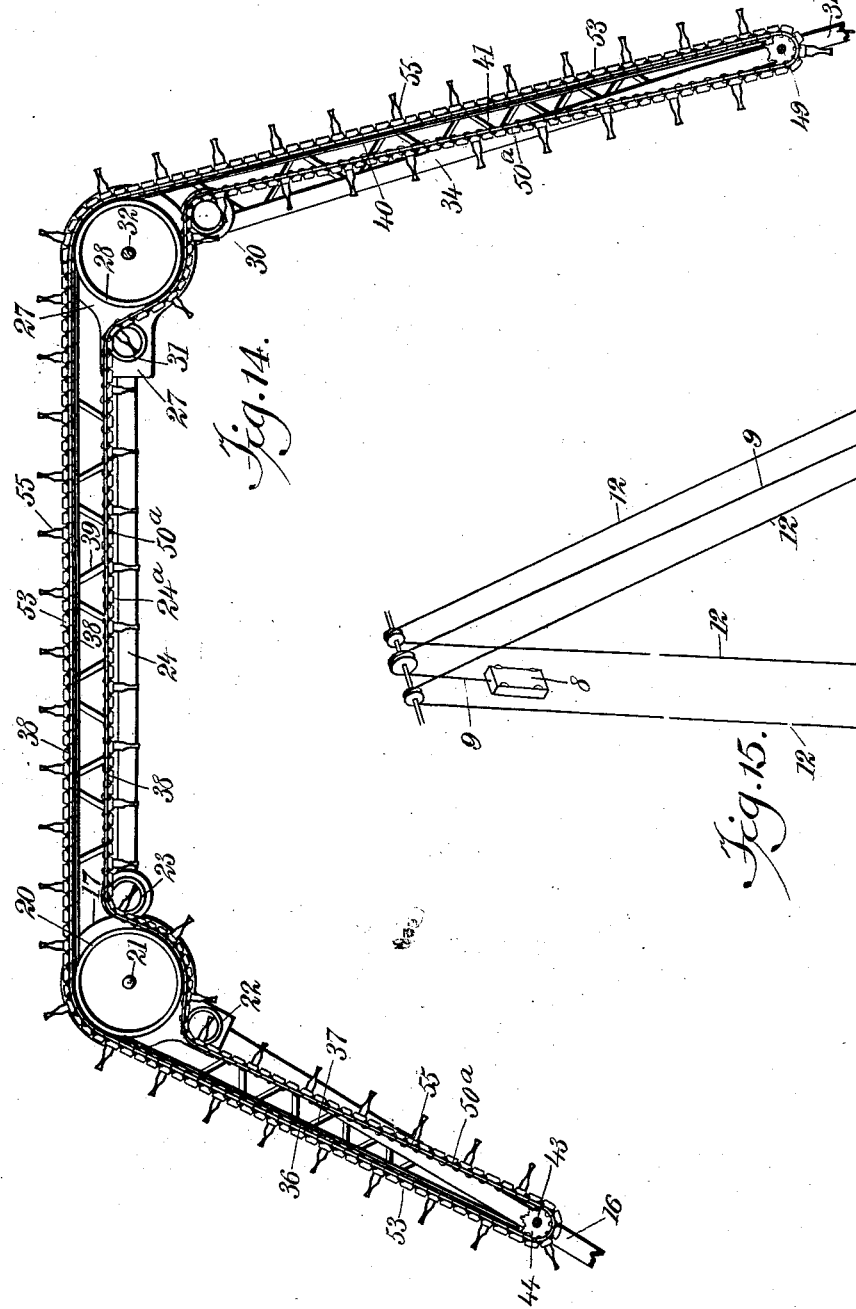
WITNESSES:
INVENTOR
James H. Torney
BY
ATTORNEYS.

No. 755,333. Patented March 22, 1904.

UNITED STATES PATENT OFFICE.

JAMES HARDEN TORNEY, OF BUFFALO, NEW YORK.

FOLDABLE CONVEYER.

SPECIFICATION forming part of Letters Patent No. 755,333, dated March 22, 1904.

Application filed March 10, 1903. Serial No. 147,092. (No model.)

*To all whom it may concern:*

Be it known that I, JAMES HARDEN TORNEY, a citizen of the United States, and a resident of Buffalo, in the county of Erie and State of New York, have invented a new and Improved Foldable Conveyer, of which the following is a full, clear, and exact description.

This invention relates to improvements in conveying apparatus designed for loading or unloading any kind of package freight from a vessel to a dock, or vice versa, although it may be adapted to the handling of bulk freight, and it may also be used in connection with cars, vehicles, and in many other ways.

Among other objects my invention is designed to expedite the handling of freight and to reduce the manual labor in connection therewith; to enable the cargo of a vessel to be loaded or unloaded through the upper-deck hatches, thus saving the time and labor of men in transporting the freight through gangways; to minimize the liability of damage to the freight, particularly to frail packages; to compensate for the draft of the vessel during the loading or unloading operations, and to provide for the folding of the apparatus in compact relation to a warehouse when it is not in service.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1 is an elevation of my conveyer mechanism in operative position between a marine vessel and a warehouse, the working position of the conveyer being shown by full lines and its folded position being indicated by dotted lines. Figs. 2 and 3 are views in edge and side elevation, respectively, showing a portion of the stationary inner leg of the conveyer-frame. Figs. 4 and 5 are views in side and edge elevation, respectively, showing a part of the inner joint between the inner conveyer-leg and the horizontal foldable member of the conveyer-frame. Figs. 6 and 7 are views in side and edge elevation, respectively, of the outer joint between the horizontal member of the conveyer-frame and the outer foldable member of said frame. Figs. 8 and 9 are views in side and transverse section, showing a portion of the conveyer. Figs. 10 and 11 are views in edge and side elevation, respectively, on an enlarged scale, of another form of hook or flight adapted to be used in series on the endless conveyer. Fig. 12 is a diagrammatic view illustrating the running of the conveyer. Fig. 13 is a detail view of a modification. Fig. 14 is an enlarged view of the endless conveyer and the foldable frame therefor, a portion of said frame being omitted; and Fig. 15 is a view illustrating the arrangement of the cables for counterbalancing and hoisting the foldable conveyer.

A indicates a portion of a pier or dock on which is erected a warehouse, (indicated partly at B,) and adjacent to the dock I have shown a marine vessel C, which is adapted to be loaded with freight from the warehouse, or the freight may be transferred from the vessel into the warehouse by the use of my improved conveyer. For supporting certain parts of the conveyer mechanism I employ an upright frame 5, which is erected on the dock or pier and serves to support a mast, tower, or superposed frame 6, the latter extending a suitable distance above the dock and supporting the means for counterweighting and hoisting the conveyer mechanism. This member 6 of the framework is shown by Fig. 1 as having a lateral offset track 7, which may be curved from the frame member 6 toward the warehouse, and on this track is arranged to travel a wheeled carriage 8, to one end of which is connected a cable, rope, or chain 9, which runs up to and over a middle sheave 10, that is idly journaled at the upper part of the frame member 6, said cable 9 being connected at its other end to a bail 11 on the frame of the foldable elevator, as will hereinafter more fully appear. A pair of hoisting-cables 12 are arranged to run to and over the side sheaves 13, which are loosely journaled at the upper part of the frame member 6 on opposite sides of the middle sheave 10, and these hoisting-cables 12 each have one end thereof made fast and attached to a pivotal shaft 32 between the outer and intermediate members of a foldable conveyer-frame. Said hoisting-cables are extended from the sheaves 13 downwardly along the side of the members 5 6 of the upright frame, and the lower ends of said cables 12 are coiled on drums 14, carried by a suitable shaft 15, which may be rotated in any suitable way for the purpose of coiling the cables on the drums and raising the elevator to a folded position, as indicated by dotted lines in Fig. 1. The traveling carriage 8 may be equipped with any suitable number of counterweights, which serve to balance the weight of the suspended members of the conveyer, thereby counterpoising the conveyer and facilitating the operation of adjusting certain parts of the conveyer to their operative or inoperative positions.

The conveyer which I employ is of the endless traveling variety consisting of three members—namely, an inner member or leg, a horizontal foldable member, and an outer foldable member or leg. The endless traveling conveyer is adapted to run on a frame and a track conforming to the several members of said conveyer and constructed in sections to permit of folding said frame when the conveyer is out of use. The frame for the conveyer also consists of two inner and outer legs and a horizontal member, the detailed construction of which is shown by the several figures of the drawings. The inner leg or member of the conveyer-supporting frame consists of the channel-irons 16, arranged in inclined positions (shown by Fig. 1) and disposed parallel to each other, as represented by Fig. 3. These channel-irons of the inner leg are secured firmly in place in any suitable way on the dock or pier or within the warehouse, and the upper ends of said channel-irons are fastened to the plates 17 of the inner pivotal joint between the horizontal member of the conveyer-frame and the inner stationary leg of said frame. The plates 17 are provided with sockets 18, in which are received the upper ends of the channel-irons 16, and these plates are thus mounted in stationary positions on or adjacent to the frame member 5. The plates are provided on their opposing faces with the segmental guides 19, which are shown in the form of circular flanges, as represented by Figs. 4 and 5, and through the plates passes the horizontal pivotal shaft 21, the latter being supported in suitable bearings on the portion 5 of the framework. The plates 17 of the inner joint are provided on their inner faces with the curved guides 22, which may be integral with or attached to the plates, while other guides 23 are attached to the channel-irons 24 of the horizontal frame member, the purpose of said guides 22 23 being hereinafter pointed out. The horizontal foldable member of the conveyer-frame consists of channel-irons 24, arranged parallel to each other and provided at their inner ends with bearing-plates 25, said channel-irons and their bearing-plates being fitted on the pivotal shaft 21, so as to turn on a horizontal axis and in a vertical plane. The outer ends of the channel-irons 24, forming the horizontal frame, are received in sockets 26, provided on the lugs 27 of a pair of plates 28, forming the outer pivotal joint of the conveyer-frame, said channel-irons 24 being rigidly fastened by bolts or rivets to the lugs of the plates 28. These plates are provided in their inner opposing faces with the curved guides 29 in the form of circular flanges, and the plates are also provided with smaller curved guides 31, which may be integral with or attached to said plates, as shown by Figs. 6 and 7. Through the plates 28 passes another pivotal shaft 32, on the end portions of which are hung the upper ends of the channel-irons 33, forming the outer member or leg of the conveyer-frame. The channel-irons 33 have curved guides 30 attached thereto, as in Fig. 6. Said channel-irons 33 are provided at their upper ends with the bearing-plates 34, loosely fitted with said irons on the pivotal shaft 32. The channel-irons 33 are parallel throughout their length, and they are adapted to engage with an inclined runway 35, which may be placed within the vessel, as shown by Fig. 1. From this description it will appear that the conveyer-frame consists of an inner stationary leg 16, a horizontal leg 24, having pivotal connection by the shaft 21 with said stationary leg at the upper end thereof, and an outer leg 33, having pivotal connection with the horizontal member 24 by a shaft 32, whereby the member 24 and the leg 33 may be folded relatively to each other, and said member and leg may turn on the axis afforded by the shaft 21 in order to raise said parts to the dotted-line position in Fig. 1.

Each member of the sectional foldable conveyer-frame carries a length of track, said track consisting of a number of rails corresponding substantially to the length of the members of the frame. The inner leg 16 of the frame has a pair of track-rails 36, supported thereon by the intermediate lattice-work 37. The horizontal or intermediate member 24 of the conveyer-frame has a pair of track-rails 38, supported thereon by the lattice-work 39, while the outer leg 33 of the conveyer-frame supports a pair of track-rails 40 by the intermediate lattice-work 41. Said frame member 24 is also equipped with other track-rails 24$^a$ to support the idle length of the endless conveyer, said rails 24$^a$ being secured directly to the frame member 24 and below the track-rails 38. The inner ends of the rails 38, which are supported on the intermediate member 24 of the conveyer-frame, are disposed in lapping relation to the curved guides or flanges 20 on the plate 17 on the inner pivotal joint between the stationary conveyer-frame leg and the intermediate conveyer-frame member, while the outer ends of said rails 38 of the intermediate frame member 24 are disposed in like lapping relation to the curved guides or flanges 29 of the plates 28, comprising the outer pivotal joint between the outer leg 33 and the intermediate frame member 24. In like manner the upper ends of the track-rails 40, which are carried by the outer leg 33 of the conveyer-frame, have lapping relation to the curved flanges 29 on the pivotal plates or joints 28, as shown by Fig. 6, whereby the rails of the track afford practically continuous surfaces for supporting the upper lead of the endless conveyer, and said track is adapted to have its lengths fold with the members 24 33 of the conveyer-frame.

The inner stationary leg 16 of the conveyer-frame is provided with suitable shaft-bearings 42, which accommodate a horizontal conveyer-driving shaft 43, the latter being equipped with a pair of sprocket-wheels 44, which are adapted to propel an endless conveyer. Said shaft 43 is also provided with an enlarged sprocket-gear 45, adapted to be driven by an endless sprocket-chain 46, which passes around suitable guide-sprockets 47 and engages with a prime driving-shaft 48, as shown diagrammatically by Fig. 1, said driving-shaft being supported in a suitable way on the pier or dock A and adapted to be propelled from a line-shaft or any suitable type of motor. The endless conveyer has certain parts thereof constructed for engagement with the sprocket-gears 44 on the shaft 43, and from this shaft the idle lead of this conveyer runs in an upwardly-inclined direction between the channel-irons 16, forming the inner stationary leg of the conveyer-frame. Said lead extends over the guides 22 23 on the plates 17 and frame member 24 at the inner pivotal joint between the members of the conveyer-frame, thence extending in a horizontal direction between the channel-irons 24, which form the intermediate member of said conveyer-frame, and adapted to ride on the rails 24$^a$, thence extending over the guide-flanges 31 on the plates 28, forming the pivotal joint between the outer leg 33 and the intermediate member 24 of the conveyer-frame, thence over the guide-flanges 30 on the outer frame-leg, and finally said idle lead is carried in a downward direction between the channel-irons 33 of the outer leg of the conveyer-frame. This outer leg of the conveyer-frame is equipped at its free end portion with an idle shaft having sprocket-gears 49 or suitable sheaves, around which passes the endless conveyer, the active lead of which conveyer is adapted to travel on the track-rails 40 of the conveyer-frame leg 33, the guide-flanges 29 of the pivotal plates 28, the track-rails 38, which are carried by the intermediate conveyer-frame member 24, the guide-flanges 20 on the plates 17 of the inner pivotal joint, and, finally, on the track-rails 36, which are supported by the leg 16 of said conveyer-frame. As shown by Fig. 2, the track-rails 36 of the inner frame-leg are inclined relative to the channel-irons 16, so as to approach the driving-sprockets 44 on the conveyer-driving shaft 43.

It is evident that the outer leg 33 may be equipped with suitable curved flanges instead of the sprockets 49 or the sheaves, said flanges being adapted to serve as guides for the endless conveyer.

The arrangement of the endless conveyer is represented diagrammatically by Fig. 12 of the drawings, and this conveyer may be of any suitable type, although I have shown one form of the conveyer by Figs. 8 and 9 of the drawings. This conveyer consists of two endless chains 50 51, made up by links 50$^a$, which are pivotally connected at their end portions and are equipped with suitable rollers or wheels 52, adapted to travel on the surfaces afforded by the members 36, 38, and 40 of the track-rails, the guide-flanges 20 29 of the pivotal plates 17 28, respectively, and on the guide-flanges 22 23 and 30 31 of said plates 17 28. The conveyer-chains carry a plurality of slats 53, which may be fastened in any suitable way to the links of the chains—as, for example, by the plates 54 indicated in Fig. 9—and these slats afford the supporting-surface for the endless conveyer and allow the conveyer to have the desired pliability or flexibility necessary to pass around the sprocket-gears and the guide-surfaces, so as to conform to the shape of the conveyer-frame in its unfolded operative position and in its folded inoperative position. Certain of the slats 53 of the conveyer are equipped with hooks or flights 55, disposed in pairs on every sixth slat of the series, or the hooks may be disposed at any desired interval on the slats. The hooks are fastened rigidly on the slats by any approved means, and in the form of construction shown by Figs. 8 and 9 these hooks are provided with curved faces 56, which form seats for barrels or casks. The pair of hooks on each slat, however, may support a cross-rod 57, adapted to receive the filling pieces or straps 58, which are looped around the cross-rod 57 and are fastened to a separate cross-bar 57$^a$, bolted to one end of the slats, thus converting the hook into a flight adapted to carry bales, packages, or other pieces of freight.

Any suitable means may be provided for taking up slack in the endless conveyer; but, as shown by Figs. 2 and 3, I prefer to employ tighteners consisting of the plates 59, having the curved flanges 60 and the extended arms 61. Each plate is pivoted by its arm to a cross-rod 62, attached to the channel-irons 16 of the inner leg of the conveyer-frame, and on this cross-rod 62 is secured a notched wheel 63, adapted to be engaged by a pawl 64, which is pivoted at 65 to one channel-iron 16 of the inner conveyer-frame leg. The tightener-plates 61 are arranged on the members forming the inner leg of the conveyer-frame for their flanges 59 to engage with one lead of the endless conveyer, and these tightener-plates are adapted to be adjusted away from the leg in order to press their flanges against the conveyer sufficiently to take up slack therein. The conveyer may thus be kept in a taut condition by adjustment of the tighteners, which are held in different positions by the locking mechanism, consisting of the notched wheel and the pawl.

In lieu of the circular guide-flanges 22 23 or the similar guide-flanges 30 31 I may employ guide-sheaves or sprocket-wheels, as indicated at 66 in Fig. 13 of the drawings. I prefer to loosely connect the bail 11 to the pivotal shaft 32 between the outer foldable leg 33 and the intermediate member 24 of the conveyer-frame, thus making provision for the connection of counterbalance-weight to the conveyer-frame and also providing for the application of the hoisting power to the frame at a point which allows said frame to be easily and quickly raised to its folded position.

In using my invention and assuming that the conveyer is in the folded position shown by Fig. 1 the operator rotates the shaft 15, so as to uncoil the cables 12 from the hoisting-drums 14. This allows the weight of the conveyer-frame to unfold itself, the member 24 of said frame turning on the pivotal shaft 21, while the member 33 turns on the pivotal shaft 32. The member 24 of the conveyer-frame is lowered to a substantially horizontal position in order that it may project outwardly from the pivotal shaft 21 into overhanging relation to a marine vessel, such as C, while the outer leg 33 of the conveyer-frame drops either in a straight downward direction or in an inclined direction from the overhanging intermediate member 24 of the conveyer-frame. The endless conveyer of course adjusts itself to the position of the members forming the conveyer-frame, and this conveyer is thus adapted to be lowered through the hatchway of the vessel. During the lowering movement of the conveyer-frame and the conveyer the cable 9 is drawn on to raise the weight-carriage, the latter assuming the position shown by full lines in Fig. 1 when the conveyer is in use. Motion may now be applied to the shaft 48, which through the sprocket-chain 46 drives the sprocket 45 on the shaft 43, and the sprocket-gears 44 are thus rotated in a way to impart motion to the endless conveyer, which travels in the direction indicated by the arrows in Fig. 12. As the conveyer passes around the sprocket-gears 49 at the lower end of the outer leg 33 the freight of whatever character should be placed by the attendants on the hooks or flights of said conveyer. The freight is thus carried along the members 33, 24, and 16 of the conveyer-frame and discharged on the pier or dock preparatory to transporting it within the warehouse, thus making provision for rapidly and economically unloading a vessel. If it is desired to transfer the freight from the pier or the warehouse into the vessel, the conveyer should be run in an opposite direction for the purpose of carrying the freight matter from the leg 16 to and along the frame member 24 and the leg 33, thus depositing the freight within the hold of the vessel, from whence the freight may be moved by the attendants and properly packed. It is evident that a series of these conveyers may be employed in the several hatchways of the vessel, and by this system of loading or discharging freight I am able to overcome the very serious objection due to hand labor, wherein it is impossible to work a large force of men during the first hour of breaking into a cargo or the last hour in finishing up the loading of a cargo. My improved conveyer may be adjusted to accommodate itself to all changes in the draft of the vessel, and the use of the conveyer obviates the handling of freight through the gangways.

Although I have shown and described a particular style of endless conveyer adapted for handling package freight, it will be understood that the type of endless conveyer is not material and that I may employ a conveyer equipped with buckets for the purpose of handling freight in bulk.

The guide-flanges 23 and 30 are attached to the frame members 24 and 33, respectively, to be foldable therewith, and the series of guide-flanges 22 23 31 30 or their equivalents must be such that the endless conveyer is always in contact with the main guides 20 and 29 on the plates 17 27, respectively, whereby the leads of the endless conveyer are so disposed as to be kept under equal tension in all positions of the conveyer and its frame.

In the drawings I have shown the inner leg of the conveyer-frame as adapted to occupy a stationary position; but it is evident that said inner leg may be arranged to swing from the same center—*i. e.*, the shaft 21—as the intermediate frame member, thus making the inner leg foldable in the same way as the outer leg. In this event provision is made for applying the power to the endless conveyer at the center afforded by the shaft 21, as will be understood by those skilled in the art.

Having thus described my invention, I claim as new and desire to secure by Letters Patent—

1. In a conveying apparatus, the combination of a sectional foldable frame having an inner leg, an outwardly-extending member, and a depending leg, means for hoisting said members of the foldable frame, a counterweight connected with the foldable part of said frame and guided for movement in a path lateral with respect to the inner frame-leg, and an endless conveyer operatively fitted to the frame members.

2. In a conveying apparatus, a conveyer-frame having inner and outer legs connected pivotally to the respective end portions of an intermediate member and adapted to be adjusted or folded relatively one to the other, means for counterweighting the frame, and a hoisting mechanism connected with said frame, in combination with an endless conveyer operatively fitted to the frame members and conforming readily to changes in positions thereof.

3. In a conveying apparatus, the combination with an upright frame, of a sectional conveyer-frame having an outer leg pivoted to an intermediate frame member, a counterweight having a cable guided by the upright frame and attached to the conveyer-frame at the pivotal joint between the outer and intermediate members of the conveyer-frame, and hoisting-cables also guided by the upright frame and connected to the foldable conveyer-frame.

4. In a conveying apparatus, the combination with an upright frame, and a guide-track, of a foldable conveyer-frame arranged to extend outwardly and downwardly from said upright frame, a weight-carriage adapted to said track, a cable between said weight-carriage and the foldable conveyer-frame, a hoisting mechanism connected with said conveyer-frame, and an endless conveyer operatively fitted to the conveyer-frame.

5. In a conveying apparatus, an adjustable conveyer-frame consisting of inner and outer legs, and an intermediate member pivotally connected one to the other, guide-surfaces on the parts adjacent the pivotal connection thereof, and track-rails on said parts forming with the guide-surfaces practically continuous supports for a conveyer, and an endless conveyer adapted to said track-rails and the guide-surfaces of said conveyer-frame.

6. In a conveying apparatus, a conveyer-frame consisting of inner and outer legs connected pivotally and by an intermediate member, and lengths of track-rails carried by the several members of the conveyer-frame and foldable therewith, said track-rails coöperating with the pivotal connections between the frame members to afford continuous track-surfaces, in combination with means for adjusting the conveyer-frame, and an endless conveyer operatively fitted to said conveyer-frame.

7. In a conveying apparatus an adjustable conveyer-frame comprising inner and outer legs, and an intermediate member, plates fastened to certain frame members and having pivotal connection with other frame members, said plates being furnished with suitable guide-surfaces, and lengths of track-rails carried by the respective members of the frame and operatively disposed with relation to the guide-surfaces on said plates, in combination with means for adjusting said frame, and an endless conveyer operatively fitted to the tracks and guide-surfaces of the conveyer-frame.

8. In a conveying apparatus, an endless conveyer provided with outwardly-projecting flights, a cross-rod supported by said flights, and intermediate filling-pieces attached to said cross-rod.

9. In a conveying apparatus, the combination of a foldable sectional frame having an inner stationary leg, and an outer foldable leg connected by an intermediate pivotal member, a driving-shaft on the inner stationary leg of the frame, an idle shaft on the outer foldable leg of the frame, an endless conveyer operatively fitted to said shafts and to the members of the frame, tightening devices mounted on the stationary leg of the frame and engaging with said endless conveyer, and means for locking the tightening devices in their adjusted positions.

10. A conveying apparatus having a frame consisting of an intermediate member and legs pivoted to the respective ends of the intermediate member, one of said legs and the intermediate member being foldable in close relation laterally with respect to each other, a hoisting mechanism connected to said frame for bodily lifting the intermediate member and one of the legs, a continuous endless conveyer supported by the frame, and groups of guide devices carried by the frame at the pivotal joints thereof; certain of said guide devices engaging with the leads of the conveyer on opposite sides of the frame-joints for keeping the latter in a taut condition at points where the conveyer conforms to the angle of the frame.

11. A conveying apparatus having a frame member pivotally supported at a fixed point, a leg pivoted to the outer end of the frame member, a continuous endless conveyer, a group of guide devices, one guide engaging with the opposing faces of the respective leads of the conveyer and other guide devices located on the respective sides of the pivot between the member and the leg and engaging with the other side of one lead of the conveyer from the first-named guide, and means for raising the frame member, the leg and the conveyer; said leg and a portion of the conveyer being movable to variable positions relative to the frame member.

12. In a conveying apparatus, a foldable frame having members, hinge-plates pivotally connecting said members, guides on said plates, other guides movable with the frame members, and an endless conveyer supported by the frame and fitted to said guides, the latter being effective in retaining the conveyer in a taut condition.

In testimony whereof I have signed my name to this specification in the presence of two subscribing witnesses.

JAMES HARDEN TORNEY.

Witnesses:
O. J. VINET,
GUS RADETZKI.